July 24, 1951 W. SENFT 2,562,133
AUTOMATIC ARC WELDING WITH COATED ELECTRODES
Filed Dec. 12, 1949 3 Sheets-Sheet 1
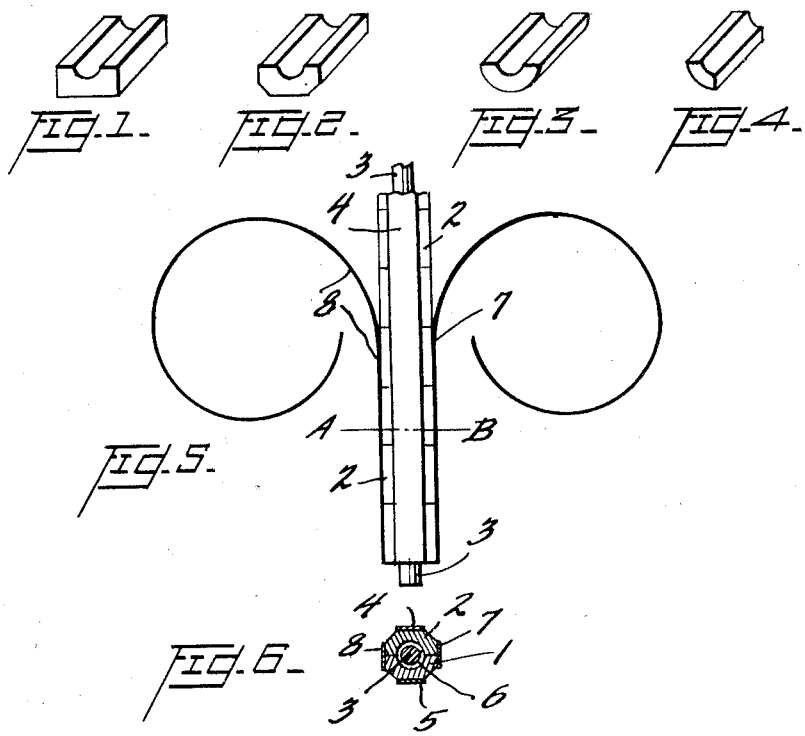
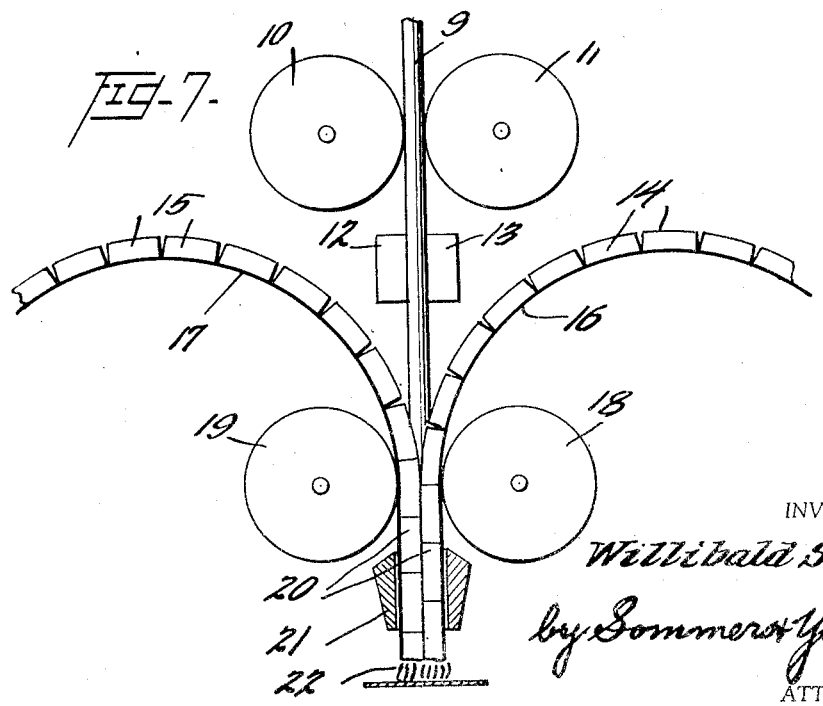
INVENTOR
Willibald Senft,
by Sommers & Young
ATTORNEYS July 24, 1951 W. SENFT 2,562,133
AUTOMATIC ARC WELDING WITH COATED ELECTRODES
Filed Dec. 12, 1949 3 Sheets-Sheet 2
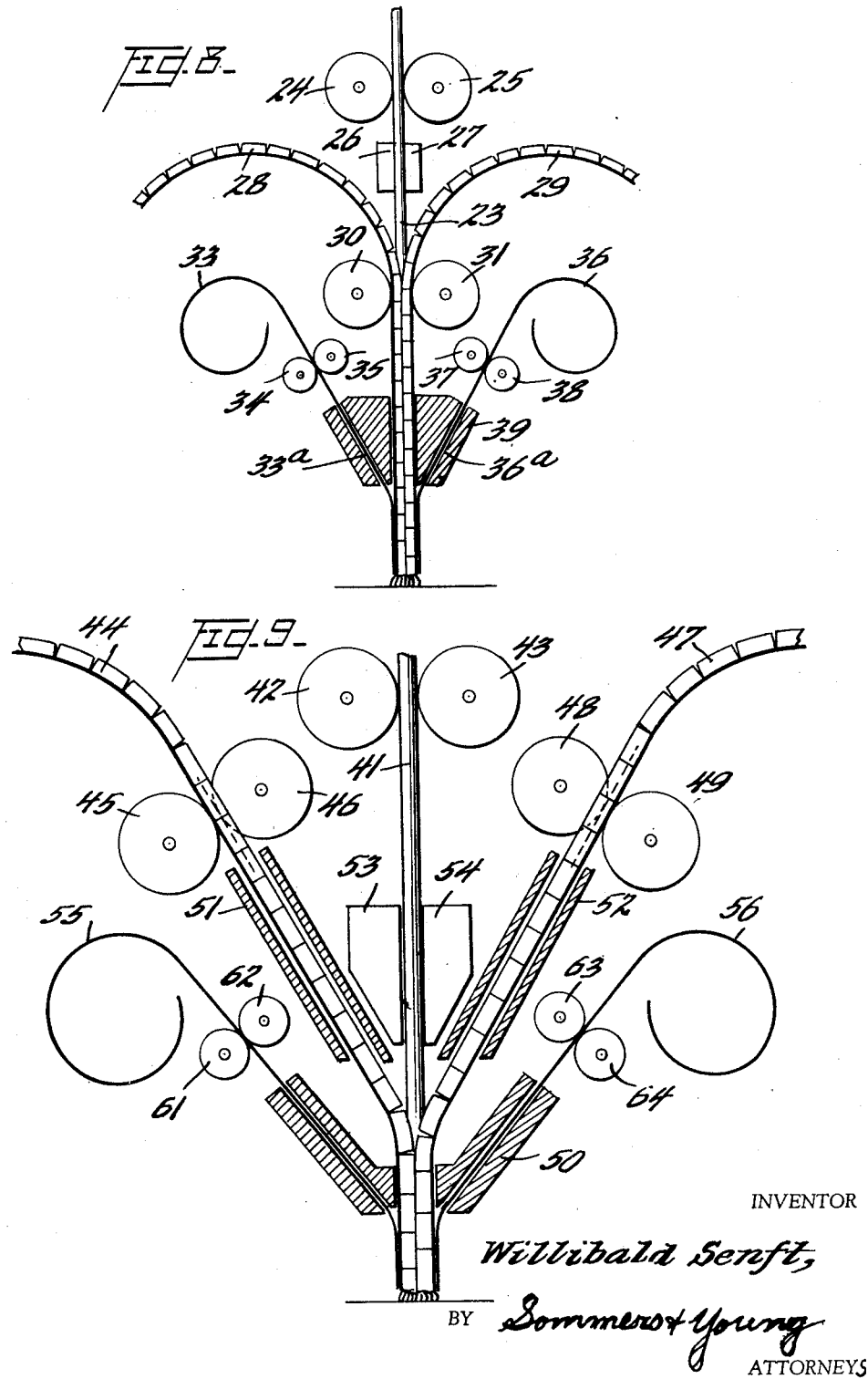
INVENTOR
Willibald Senft,
BY Sommers+Young
ATTORNEYS

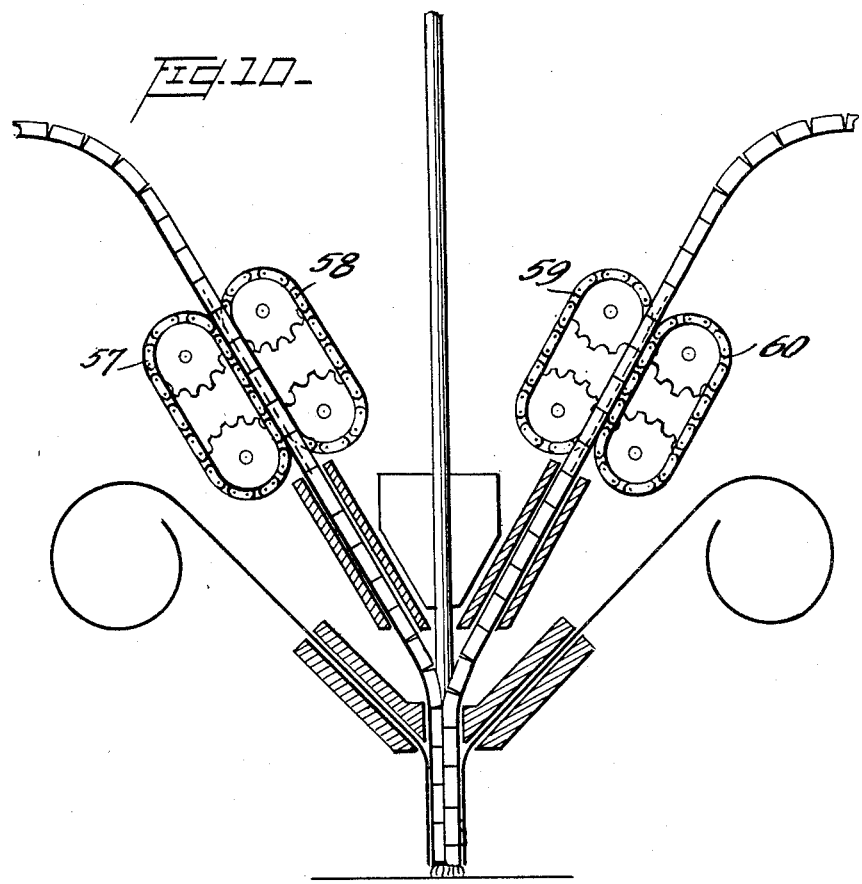
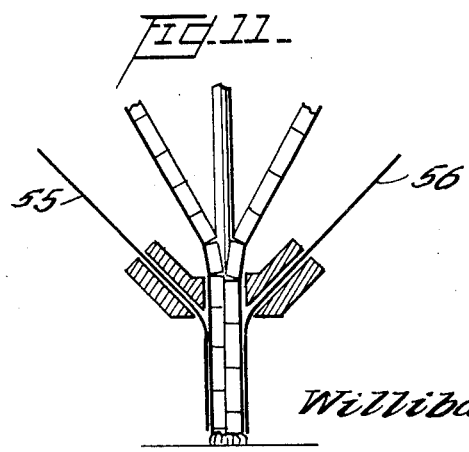

Patented July 24, 1951

2,562,133

UNITED STATES PATENT OFFICE 2,562,133

AUTOMATIC ARC WELDING WITH COATED ELECTRODES

Willibald Senft, Weiz, near Graz, Styria, Austria, assignor to Elin Aktiengesellschaft für elektrische Industrie, Vienna, Austria, a joint-stock corporation of Austria Application December 12, 1949, Serial No. 132,549
In Austria June 27, 1946

13 Claims. (Cl. 219—8)

This application is a continuation-in-part of my co-pending application, Serial No. 762,407, filed July 2, 1947.

There has been invented and developed up to now many devices intended for fully automatic arc welding by means of covered electrodes, in which the electrode wire is fed to the welding head, in a bare state, has then welding current supplied to it and is thereafter surrounded by the flux material and fed to the arc in a fully covered state.

One chief consideration in such a feeding process is to reduce the length of the welding-current path along the electrode core to a minimum as in this way there may be applied stronger currents which give better welds and allow of greater welding speeds. The enveloping process should thus be accommodated within as short a space as possible between the current contact and the arc.

The present invention comprises a method whereby the enveloping process is effected in a very efficient manner requiring such a short length of electrode wire between the current feeding means and the arc, as is not attained by any known method.

In accordance with the invention the flux material is fed in the form of ready-shaped rigid pieces of predetermined short lengths to the electrode core. The pieces are assembled around the core so as to build up a complete covering, are secured in the assembled state and the covering is fed together with the electrode core to the arc.

The covering pieces are preferably connected with each other by attaching them to a common base serving as a flexible guiding or carrying member, for example, tape, string, or wire, and they thus form a kind of cover chain. The tape may consist of incombustible material, for example, asbestos or glass-silk. The attaching may be done by pasting the pieces on the guiding member, for example, with water-glass, or in another mechanical manner e. g. by means of wire clamps which, while shaping the pieces in a separate device similar to that described below, are pressed into them.

The shaped pieces can be produced outside the weld head, advantageously in an apparatus completely separated from the automatic arc welding device, for example, by casting, pressing, or punching, in the required dimensions or by forming sticks of greater length which, in a further step of production, are divided, for example, by cutting, sawing or breaking, into pieces of the desired dimensions.

The grooved faces of the covering pieces are so shaped that, when their several rows are assembled around the blank wire, the grooves are joined to form a hollow space which encloses the wire completely. The cross-sectional area of the hollow space may be identical with the cross-sectional area of the blank wire, so that the wire is in contact all over its circumference with the covering material. In this development of my invention the shaped pieces may be fastened to the wire itself, for example, by pasting them on it or by clamping them on it. Then the wire and covering are necessarily fed to the arc at the same speed and the thickness of the shaped pieces is then predetermined because the quantity of the covering material fed to the arc must agree with the needs of the particular wire.

In a further development of my invention, the cross-sectional area of the hollow space formed by the assembled shaped pieces may be greater than the cross-sectional area of the wire and preferably may be so dimensioned that the wire can move freely within the hollow space. The covering pieces may in this case be thicker or thinner than would be required if the covering were in contact all over the cirmcumference of the wire and fastened to it. Important advantages are obtained with a covering that, by means of a separate adjustable feeding mechanism, can be moved independently of the feeding speed of the wire. The quantity of covering material fed and thus the amount of slag produced can then be varied according to the special needs, also during the welding process. Furthermore, weld wires of different diameter can be used without having to take shaped pieces of other dimensions. The feeding rate of the covering may be adjusted so as to depend on the welding arc or also to be quite independent of the same.

The rows of covering pieces which are not fastened to the weld wire itself may be united, according to my invention, with one another to a rigid covering fully enclosing the wire by some binding means, for example, clamps or, preferably, by pasting an adhesive tape or stripe over the outside longitudinal joints of the rows of covering pieces.

According to a further development of my invention the several rows of covering pieces, instead of uniting them to a rigid covering either by fixing them to the wire and/or fastening them to each other by a binding means, may be firmly held together in the assembled state, to the very moment of fusing down in the arc, by means of spring pressure exerted from outside against the rows toward the wire so that the spring forces will, in total, substantially balance one another. This is achieved for example by resilient wires, for example steel wires, preferably flat wires. Since the spring wires, though outside the covering, are affected by the burning arc and eventually fuse down, they are continuously fed toward the arc for example, from a coil. The rate, at which the spring wires are fed, preferably is independent of the feeding rate of the covering and may advantageously be much smaller than the latter, amounting only to a fraction thereof. Each spring wire is fed from its coil in a plane common to the weld wire axis and the axis of the row upon which it will press, and approaches its row obliquely. On meeting it the spring wire is deflected and presses its row tightly toward the weld wire axis until the covering fuses down in the arc.

According to one embodiment of my invention there is arranged only one set of driving rollers which is positioned between the current-feeding means and the welding nozzle and which is feeding the two rows of flux pieces.

In accordance with a further development of my invention, the two rows are fed each by means of a separate pair of driving rollers, whereby the current feeding means may be positioned immediately above the welding nozzle. The separate pairs of rollers may be made of metal or resilient material as rubber, leather and the like and guarantee an absolutely reliably equal feeding of the rows which is very important for obtaining a good weld. Furthermore, the current feeding means lying immediately above the welding nozzle allow to feed more current to the electrode so as to improve the welding effect and the economy of welding.

Instead of feeding rollers there may be used endless transport belts which are elastically pressed against the row. These transport belts may be made of resilient materials as leather or rubber or of metal, for example, as a sort of caterpillar-chain. Preferably, the cross-section of the transport belts are adapted to the cross-section of the row of flux pieces. In this sort of driving the pressure necessary to take the row along with the belt is comparatively small so that damage to the row is made impossible. This driving belt is therefore fit especially for welding apparatus using rows of fragile flux material.

My invention and several embodiments of the same are hereafter more particularly described with reference to the drawings:

Figs. 1 to 4 show different types of the rigid covering pieces, Fig. 5 is an elevation and Fig. 6 is a cross-section along line AB of Fig. 5, respectively, of the assembled covered electrode. Fig. 7 is a diagrammatic view of those parts of the automatic welding device which are the subject matter of my invention or are essential to explain its mode of operation. Fig. 8 is a similar view of a preferred embodiment of my invention. Figs. 9, 10 and 11 illustrate a welding head with feeding means for the bare electrode core and distinct feeding means for each of the two cover chains.

Figs. 1 to 4 and 6 show that the covering pieces may be shaped so that, when assembled to the complete covering, the cross-section of the latter is either rectangular, or polygonal, or circular, just as may be suitable, for example, for producing, guiding and assembling purposes. Fig. 4 shows moreover a covering piece of a type of which more than two rows are necessary for assembling them to a complete covering.

In Figs. 5 and 6, the shaped pieces 1 and 2, each representing a symmetrical half or the complete covering, are shown assembled around the blank electrode 3 and connected with the other pieces of the same row by means of the tapes 4 and 5. The electrode 3 has, in the illustrated embodiment, a smaller diameter than the hollow space left by the covering pieces 1 and 2, so that there is an interstice 6 between the inner walls of the pieces 1 and 2 and the surface of the electrode 3, allowing for different feeding rates of core and covering. Since the pieces 1 and 2 are not pasted on or otherwise attached to the electrode 3, they are united to a rigid covering body by applying to them at the sides where the guiding tapes 4 and 5 do not hold in their rows the pieces 2 and 1, respectively, adhesive tapes 7 and 8 from supports and by means of feeding devices not shown in the drawing.

Fig. 7 shows that the blank electrode 9 which, being of great length, may be fed in known manner from a bobbin, is driven by the rollers 10 and 11 and is sliding past the contact surfaces 12 and 13 which supply the welding current. Two rows 14 and 15 of covering pieces attached to tapes 16 and 17, respectively, are fed by driving rollers 18 and 19, respectively, from supports and along carriers not illustrated, and are assembled by these rollers so as to form a complete covering 20 for the electrode 9. The electrode 9 and the covering 20 are then fed through the guide nozzle 21 to the arc 22.

In the embodiment shown in Fig. 8, the blank electrode 23 is driven by the rollers 24 and 25 to slide past the contact surfaces 26 and 27 which supply the welding current, and to pass through the guide nozzle 39 to the arc 40. The rows 28 and 29 of the covering pieces are driven by the rollers 30 and 31, respectively, and assembled by these rollers to a complete covering 32 which has sufficient hollow space inside to allow for free movement of the electrode 23 with respect to the covering 32. Steel wires 33 and 36 are fed by driving rollers 34, 35 and 37, 38, respectively, through openings 33a and 36a, respectively, in the guide nozzle 39 toward the covering 32 in oblique direction so that the steel wires will press together the rows 28 and 29 until the shaped pieces will fuse down in the arc 40.

Fig. 9 shows in elevational view an embodiment of my invention, in which the electrode core 41 is fed to the welding arc by means of a pair of feeding rollers 42 and 43. The row 44 of flux pieces is advanced by means of the feeding-roller pair 45 and 46, while the row 47 of flux pieces is advanced by means of the feeding roller pair 48 and 49, so that the core 41 will be surrounded by the rows in the welding nozzle 50. Conducting channels 51, 52 prevent the rows 44 and 47 from being bent from their straight way during their advancing movement. 53 and 54 indicate the current feeding device which in this embodiment is separated from the arc only by the welding nozzle whereas the driving rollers are eliminated from this interstice. The rows 44 and 47 are pressed against the electrode core by steel wires 55 and 56 of flat cross-section in a way similar to that described in connection with Fig. 8.

Fig. 10 shows the modified embodiment of my invention in which the transport belts 57, 58 and 59, 60 are constructed as caterpillar-chains.

In the design illustrated by Fig. 9 or 10 the flat steel wires 55 and 56 may be advanced continually in dependence on the feeding speed of the electrode by roller pairs 61, 62 and 63, 64. In some cases it will however be sufficient to advance and renew the flat steel wire only from time to time. Therefore these steel wires may be designed as fixed springs or so as to be advanced by hand. Preferably, the springs are made of heat resistant material.

Fig. 11 shows a construction, allowing to advance the springs 65 and 66 by hand.

I claim:

1. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up rows, assembling said rows around the core so as to build up a complete covering with a hole inside of a larger diameter than that of said electrode core, fastening said rows to one another and feeding said covering to the arc by feeding means distinct from the means which feed said core to the arc.

2. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up rows, assembling said rows around the core so as to build up a complete covering with a hole inside of a larger diameter than said electrode core, fastening said rows to one another and feeding said covering to the arc by feeding means distinct from the means which feed said core to the arc, feeding said covering with a velocity distinct from the velocity with which said electrode core is fed to the arc.

3. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected to one another so as to build up rows, assembling said rows around the core so as to build up a complete covering, securing said rows in the assembled state by means of spring-pressure exerted between the point of said assembling and the arc and feeding said covering together with said electrode core to the arc.

4. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up rows, assembling said rows around the core so as to build upon a complete covering, securing said rows in the assembled state by means of spring pressure exerted by resilient flat wires accompanying said covered electrode from a point under the point of said assembling to the arc and feeding said covering together with said electrode core and together with said resilient wires to the arc.

5. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up rows, assembling said rows around the core so as to build up a complete covering, securing said rows in the assembled state by means of spring pressure exerted by resilient flat wires accompanying said covered electrode from a point under the point of said assembling to the arc and feeding said resilient wires to the arc with a velocity much smaller than the velocities with which are fed said covering and said electrode core to the arc.

6. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up two rows, said two rows being fed in a common plane with said electrode core from opposite sides at small angles to an assembling point on said core, said rows being bent in the neighbourhood of said assembling point so as to lie flat on and covering said core between said assembling point and the arc, feeding said covered electrode through a welding nozzle and securing said covering in the assembled state between said welding nozzle and the arc by means of two flat resilient wires, accompanying said covered electrode from said nozzle to the arc.

7. In a method of automatic electric arc welding comprising feeding a bare electrode core to the welding head, supplying current to said electrode core, covering said core with flux material and feeding the covered electrode to the arc, the step of feeding said flux material in the form of ready-shaped rigid pieces of predetermined short length pliably connected with one another so as to build up two rows, said two rows being fed in a common plane with said electrode core from opposite sides at small angles to an assembling point on said core, said rows being bent in the neighbourhood of said assembling point so as to lie flat on and covering said core between said assembling point and the arc, the core and each of the two rows having independent feeding means feeding the core and the two rows with individually regulable velocities to said assembling point and therefrom through a welding nozzle in the assembled state to the arc.

8. In an automatic arc welding device for covered electrodes, in a common plane a bare electrode of great length, two rows of ready-shaped rigid pieces a predetermined short length of covering material located at small angles symmetrically with respect to the bare electrode, the latter and the two rows arranged in substantially straight lines directed to a common point above the welding nozzle, the rows being bent in the neighbourhood of this point so as to lie flat on the electrode core in the nozzle, a pair of rollers feeding the electrode core and two pairs of rollers, one pair for each row, feeding the core and each of the two rows, independently from one another, the three pairs of rollers being located at points above the welding nozzle, where the core and the rows are separate from one another.

9. In an automatic arc welding device for covered electrodes in a common plane a bare electrode of great length, two rows of ready-shaped rigid pieces of predetermined short length of covering material and two wires of resilient material, the two rows located symmetrically at small angles to the bare electrode, the latter and the two rows arranged in substantially straight lines directed to a common point above the welding nozzle, the rows being bent in the neighbourhood of this point so as to lie flat on the electrode core in the nozzle, said wires being located symmetrically at small angles with respect to the bare electrode core and arranged in substantially straight lines directed to a common point on the electrode core beneath the nozzle, the wires being bent, in the neighbourhood of this point, so as to lie flat on the two rows building up the electrode covering, the wires holding the rows in assembled position in the vicinity of the arc, a pair of rollers for feeding the electrode core, two pairs of rollers, one pair for each row, for feeding independently the core and each of the two rows and two pairs of rollers, one for each wire, for feeding independently each of the two wires, the five pairs of rollers being located above the nozzle, where the core, the rows and the wires are separate from one another.

10. In automatic arc welding device for covered electrodes in a common plane a bare electrode of great length, two rows of ready-shaped rigid pieces of predetermined short length of covering material and two wires of resilient material, the two rows located symmetrically at small angles with respect to the bare electrode, the latter and the two rows arranged in substantially straight lines directed to a common point above the welding nozzle, the rows being bent in the neighborhood of this point so as to lie flat on the electrode core in the nozzle, said wires being located symmetrically at small angles with respect to the bare electrode core and arranged in substantially straight lines directed to a common point on the electrode core beneath the nozzle, the wires being bent, in the neighbourhood of this point, so as to lie flat, on the two rows building up the electrode covering, the wires holding the rows in assembled position in the vicinity of the arc, a pair of rollers for feeding the electrode core, two pairs of rollers, one pair for each row, for feeding independently the core and each of the two rows, and two guides one for each wire for feeding independently by hand each of the two wires, the three pairs of rollers and the two guides being located above the nozzle, where the core, the rows and the wires are separate from one another.

11. In an automatic arc welding device for covered electrodes in a common plane a bare electrode of great length, two rows of ready-shaped rigid pieces of predetermined short length of covering material and two wires of resilient material, the two rows located symmetrically at small angles with respect to the bare electrode, the latter and the two rows arranged in substantially straight lines directed to a common point above the welding nozzle, the rows being bent in the neighbourhood of this point so as to lie flat on the electrode core in the nozzle, said wires being located symmetrically at small angles with respect to the bare electrode core and arranged in substantially straight lines directed to a common point on the electrode core beneath the nozzle, the wires being bent, in the neighbourhood of this point so as to lie flat on the two rows building up the electrode covering, the wires holding the rows in assembled position in the vicinity of the arc, a pair of rollers for feeding the electrode core, two pairs of endless belts, one pair for each row, with cross-sections substantially complying with the cross-section of the rows, feeding independently the core and each of the two rows and two pairs of rollers, one pair for each wire, for feeding independently each of the two wires, the three pairs of rollers and the two pairs of endless belts being located above the nozzle, where the core, the rows and the wires are separate from one another.

12. In an automatic arc welding device for covered electrodes an electrode core of great length, means for supplying current to said core, two rows of ready shaped rigid pieces of covering material, the length of the pieces being much less than the distance between the arc and the point of current supply to said core, and means for feeding said core and the two rows in an assembled state to the arc.

13. In an automatic arc welding device for covered electrodes an electrode core, two rows of ready-shaped rigid pieces of covering material, means for supplying current to said core, means for feeding and means for guiding said core and the two rows in an assembled state to the arc, said current supplying means and said feeding means being located at points, where the core and the two rows are still separate from one another, and the length of said rigid pieces being much less than the distance between said points and the arc.

WILLIBALD SENFT.

REFERENCES CITED

The following references are of record in the file of this patent:

UNITED STATES PATENTS

| Number | Name | Date |
|---|---|---|
| 1,552,369 | White | Sept. 1, 1925 |
| 1,886,643 | Chapman | Nov. 8, 1932 |
| 2,083,309 | Applegate | June 8, 1937 |
| 2,087,225 | Austin | July 13, 1937 |
| 2,093,394 | Emery | Sept. 14, 1937 |
| 2,121,693 | Henderson | June 21, 1938 |
| 2,149,490 | Allard | Mar. 7, 1939 |
| 2,277,942 | Anderson | Mar. 31, 1942 |